United States Patent
Hong et al.

(10) Patent No.: US 9,172,091 B2
(45) Date of Patent: Oct. 27, 2015

(54) CORE-SHELL TYPE ANODE ACTIVE MATERIAL FOR LITHIUM SECONDARY BATTERIES, METHOD FOR PREPARING THE SAME AND LITHIUM SECONDARY BATTERIES COMPRISING THE SAME

(75) Inventors: Ji-Jun Hong, Seoul (KR); Sung-Tae Ko, Chungcheongnam-do (KR); Yoon-Jeong Heo, Chungcheongnam-do (KR)

(73) Assignee: Kokam Co., Ltd., Siheung, Gyeonggi-do (KR)

( * ) Notice: Subject to any disclaimer, the term of this patent is extended or adjusted under 35 U.S.C. 154(b) by 0 days.

(21) Appl. No.: 12/528,104

(22) PCT Filed: Dec. 16, 2008

(86) PCT No.: PCT/KR2008/007447
§ 371 (c)(1),
(2), (4) Date: Aug. 21, 2009

(87) PCT Pub. No.: WO2010/064755
PCT Pub. Date: Jun. 10, 2010

(65) Prior Publication Data
US 2011/0244322 A1  Oct. 6, 2011

(30) Foreign Application Priority Data
Dec. 2, 2008  (KR) .......................... 10-2008-0121483

(51) Int. Cl.
| | | |
|---|---|---|
| H01M 4/587 | (2010.01) |
| H01M 4/36 | (2006.01) |
| H01M 10/0525 | (2010.01) |
| H01M 10/42 | (2006.01) |
| H01M 4/02 | (2006.01) |

(52) U.S. Cl.
CPC .............. *H01M 4/587* (2013.01); *H01M 4/364* (2013.01); *H01M 4/366* (2013.01); *H01M 10/0525* (2013.01); *H01M 10/4235* (2013.01); *H01M 4/02* (2013.01); *H01M 2004/021* (2013.01); *H01M 2200/106* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| 6,346,345 B2 | 2/2002 | Shiota et al. |
| 2006/0147790 A1 | 7/2006 | Zaghib et al. |
| 2008/0157027 A1* | 7/2008 | Manthiram et al. .......... 252/506 |

FOREIGN PATENT DOCUMENTS

| EP | 0851517 A1 | 7/1998 |
| JP | 07-161389 A | 6/1995 |
| JP | 10-241665 | 9/1998 |

(Continued)

*Primary Examiner* — Miriam Stagg
*Assistant Examiner* — Carmen Lyles-Irving
(74) *Attorney, Agent, or Firm* — Mintz Levin Cohn Ferris Glovsky and Popeo, P.C.; Kongsik Kim

(57) ABSTRACT

Provided are a core-shell type anode active material for lithium secondary batteries including a carbonaceous material core; and a shell formed outside the carbonaceous material core, the shell including a PTC (Positive Temperature Coefficient) medium. The core-shell type anode active material for lithium secondary batteries has the shell including the PTC medium, and thus has the improved conductivity and high output density, exhibiting excellent electrical characteristics. And, a lithium secondary battery manufactured using the anode active material has excellent safety, in particular safety against overcharge and external short circuit.

12 Claims, 7 Drawing Sheets

(56) References Cited

FOREIGN PATENT DOCUMENTS

| | | |
|---|---|---|
| JP | 2001-243950 A | 9/2001 |
| JP | 2009-176597 A | 8/2009 |
| KR | 1020000056533 | 9/2000 |
| KR | 2002-279996 | 9/2002 |
| KR | 1020040096279 A | 11/2004 |
| KR | 1020050035074 | 4/2005 |
| KR | 10-2006-0028327 A | 3/2006 |
| KR | 100669335 B1 | 1/2007 |
| KR | 1020080010944 | 1/2008 |

* cited by examiner (a)

(b)

(c)

(a)

(b)

(a)　　　　　　　　　　　(b)

CORE-SHELL TYPE ANODE ACTIVE MATERIAL FOR LITHIUM SECONDARY BATTERIES, METHOD FOR PREPARING THE SAME AND LITHIUM SECONDARY BATTERIES COMPRISING THE SAME

CROSS-REFERENCES TO RELATED APPLICATIONS

This application is a U.S. national phase application, pursuant to 35 U.S.C. §371, of PCT/KR2008/007447, filed Dec. 16, 2008, designating the United States, which claims priority to Korean Application No. 10-2008-0121483, filed Dec. 2, 2008. The entire contents of the aforementioned patent applications are incorporated herein by this reference.

TECHNICAL FIELD

The present invention relates to a core-shell type anode active material for lithium secondary batteries, a method for preparing the same and lithium secondary batteries comprising the same. In particular, the present invention relates to a core-shell type anode active material for lithium secondary batteries that has the improved electrical characteristics and safety, and a method for preparing the same and lithium secondary batteries comprising the same.

BACKGROUND ART

Lithium secondary batteries have a wide range of application. Small-sized lithium secondary batteries are used as power sources for driving portable electronic communication equipments such as camcorders, mobile phones or notebook computer, in particular high-performance portable equipments, and now become dominant power supplies. Recently, medium and large-sized lithium secondary batteries of high output characteristics are developed for hybrid electric vehicles (HEV) or electric vehicles (EV) applications. The research and development of the medium and large-sized lithium secondary batteries moves toward environmentally friendly power sources for uninterruptible power supplies, motor tools, vessels, artificial satellites or military wireless telegraph sets and weapon systems in various application fields of industry inside and outside of the country including Japan, Europe and U.S.A.

Currently, high crystalline carbon such as natural graphite and artificial graphite, or low crystalline carbon such as non-graphitizable carbon and graphitizable carbon is used as an anode active material for a lithium secondary battery.

Natural graphite has advantages of low cost, a flat discharge curve in the negative voltage and excellent initial discharge capacity. However, the natural graphite has disadvantages of rapid reduction in charge/discharge efficiency and charge/discharge capacity when charge and discharge cycles are repeated.

Mesophase-based graphite has a shape of spherical granule, and has a high fill density to improve the energy density per volume of battery. And, the mesophase-based graphite is advantageous in molding a polarity plate. However, the mesophase-based graphite has a drawback of low reversible capacity.

Non-graphitizable carbon has advantages of excellent safety and large capacity. However, when compared with graphitic carbon, the non-graphitizable carbon has smaller particle size and micropores, leading to lower density. And, when the non-graphitizable carbon is pulverized, its particle shape and size becomes uniform. Thus, the non-graphitizable carbon has a low fill density, resulting in poor commercialization.

Recently, to meet the demand for safety and high capacity, lithium titanium oxide becomes the center of interest. The lithium titanium oxide is evaluated to be one of materials capable of improving safety and useful as an anode active material having a stable structure of spinel shape. The use of lithium titanium oxide as an anode active material results in has excellent durability as well as flatness of a voltage-discharge curve, excellent charge/discharge cycles, and improved power and high rate discharge characteristics. However, if lithium titanium oxide is used singularly, it has a reduction in battery characteristics due to its low average voltage.

Therefore, various methods have been suggested to solve the problems of the conventional anode active material. However, any anode active material was not yet discovered that is evaluated to be excellent in both of electrical characteristics and safety of a lithium secondary battery.

For example, Korean Patent Laid-open Publication No. 10-2004-0096279 discloses a method for preparing an anode active material with improved life and high rate discharge characteristics by doping graphite with a metal (or a non-metal).

Korean Patent No. 10-0669335 discloses an anode for a lithium secondary battery, in which a thermosetting resin layer is formed on an anode current collector. Metal ions existing at the anode current collector diffuse into the thermosetting resin layer to create a concentration gradient. The surface roughness of an interface between the anode current collector and the thermosetting resin layer is increased to increase an adhesive strength therebetween, thereby improving life characteristics and safety of a battery.

Korean Patent Laid-open Publication No. 10-2008-0010944 discloses an anode for a lithium secondary battery, comprising an anode active material, and titanium oxide and styrene-butadiene(SBR) rubber on the surface of the anode active material. The used titanium oxide increases the surface resistance of carbon to prevent reduction of power in a battery. The styrene-butadiene rubber used together with titanium oxide promotes storage at high temperature due to excellent thermal safety and adhesive strength in itself.

Korean Patent No. 10-0861793 discloses an anode active material, in which graphite is surface-treated with $TiO_2$ of high electroconductivity to improve high rate discharge characteristics of a lithium secondary battery.

However, techniques suggested in the above-mentioned prior arts are regarded as insufficient to improve safety while maintaining electrical characteristics of a lithium secondary battery.

Japanese Patent Laid-open Publication No. 10-241665 discloses an electrode manufactured by adding an active material, a conductive material, a binder and a PTC (Positive Temperature Coefficient) thermistor to an electrode slurry so as to improve safety of a lithium secondary battery.

Japanese Patent Laid-open Publication No. 2002-279996 discloses a non-aqueous secondary battery manufactured by thinly coating titanic acid and barium zirconate on any one of a cathode mix layer, an anode mix layer and a separator, or by adding titanic acid and barium zirconate in a non-aqueous electrolyte so as to improve high rate discharge characteristics of a lithium secondary battery.

However, the above-mentioned two prior arts disclose techniques for manufacturing an electrode by simply mixing or adding electrode materials, and thus it is improper to express that the prior arts relate to an anode active material.

And, the techniques can improve safety of a battery to some extent, but may reduce electrical characteristics of a battery, and thus the prior arts are not evaluated to have sufficient effects.

Therefore, there are urgent demands for an anode active material for a lithium secondary battery that exhibits excellent safety while maintaining excellent battery characteristics, and a method for preparing the anode active material with excellent reproducibility and productivity.

DISCLOSURE

Technical Problem

The present invention is designed to solve the above-mentioned problems. Therefore, it is an object of the present invention to provide an anode active material for lithium secondary batteries that is capable of improving safety without deterioration of basic characteristics of a lithium secondary battery, a method for preparing the anode active material with excellent reproducibility and productivity, and a lithium secondary battery comprising the anode active material.

Technical Solution

In order to achieve the above-mentioned objects, a core-shell type anode active material for lithium secondary batteries according to the present invention comprises a carbonaceous material core; and a shell formed outside the carbonaceous material core, the shell comprising a PTC medium.

The core-shell type anode active material for lithium secondary batteries according to the present invention comprises the PTC medium in the shell, and thus has the improved conductivity, high output density, and consequently excellent electrical characteristics and sufficient thermal safety.

Optionally, the shell may further comprise at least one metal oxide selected from the group consisting of titanium dioxide and spinel-type lithium titanium oxide.

And, a method for preparing the core-shell type anode active material for lithium secondary batteries comprises (S1) preparing a core forming carbonaceous material; and (S2) forming a shell by coating the carbonaceous material core with a shell forming material comprising a PTC medium.

The above-mentioned core-shell type anode active material for lithium secondary batteries can be used in an anode of lithium secondary batteries and lithium secondary batteries comprising the anode.

MODE FOR INVENTION

Hereinafter, an anode active material for lithium secondary batteries according to the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

First, a core forming carbonaceous material is prepared (S1).

The carbonaceous material for use in the present invention is not limited to a specific material if it can be used as an anode active material for a lithium secondary battery. The carbonaceous material may include, for example, low crystalline carbon and high crystalline carbon. Generally, the low crystalline carbon includes soft carbon and hard carbon, and the high crystalline carbon includes high temperature firing carbon such as natural graphite, Kish graphite, pyrolytic carbon, mesophase pitch based carbon fiber, meso-carbon microbeads, mesophase pitches, and petroleum or coal tar pitch derived cokes.

Next, a shell is formed outside the core by coating the core with a shell forming material comprising a PTC (Positive Temperature Coefficient) medium (S2).

The PTC medium included in the shell of the anode active material according to the present invention improves thermal safety and conductivity of a battery. The PTC medium has high permittivity and strong ferroelectric properties around room temperature. However, the PTC medium undergoes a change of crystal structure in the neighborhood of a specific temperature (about 120° C. in the case of barium titanate) and the electrical resistance increases remarkably.

Figure 1:
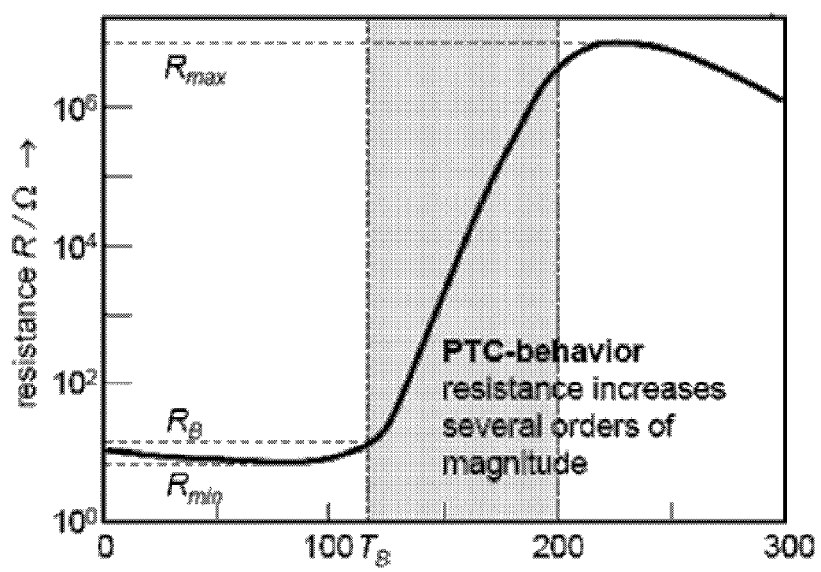
FIG. 1 is a graph illustrating resistance behavior of barium titanate particle at a specific temperature.
Figure 2:
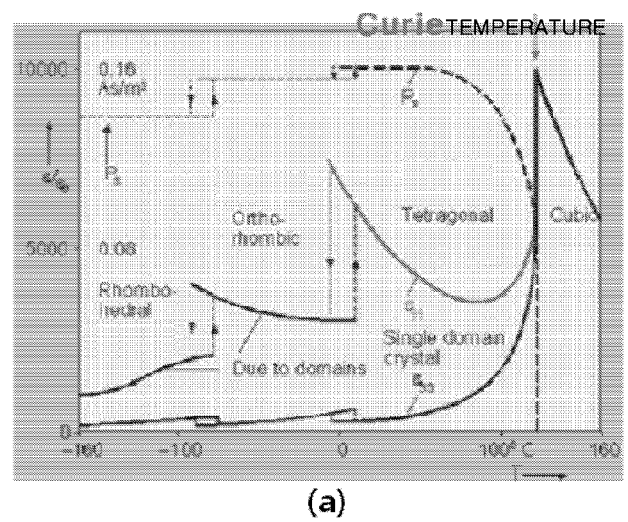
FIG. 2(a) is a graph illustrating transformation of barium titanate from a tetragonal structure below the phase transition temperature to a cubic structure above the phase transition temperature.
FIG. 2(b) is a schematic view illustrating spontaneous polarization occurred by displacement of positive ions ($Ti^{4+}$, $Ba^{2+}$) and negative ions ($O^{2-}$) in different directions below the phase transition temperature (tetragonal structure)
FIG. 2(c) is a schematic view illustrating a crystal structure in the neighborhood of about 120°C.
Figure 2:
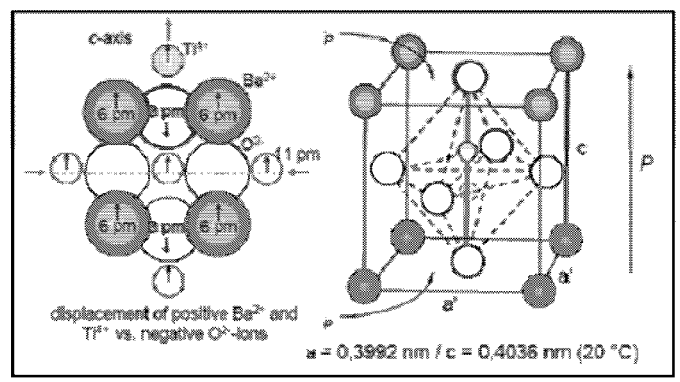
Figure 2:
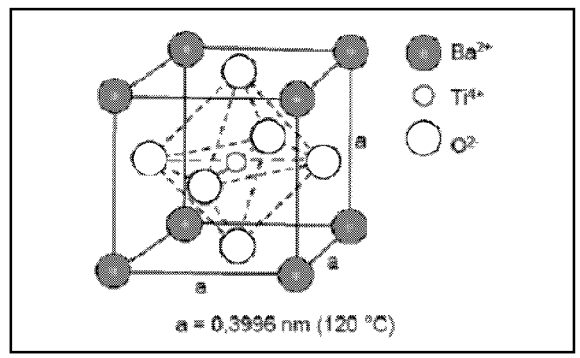

FIG. 1 is a graph illustrating resistance behavior at a specific temperature in particles of barium titanate as a typical PTC medium. FIG. 2(a) is a graph illustrating transformation of barium titanate from a tetragonal structure below the phase transition temperature to a cubic structure above the phase transition temperature, FIG. 2(b) is a schematic view illustrating spontaneous polarization occurred by displacement of positive ions ($Ti^{4+}$, $Ba^{2+}$) and negative ions ($O^{2-}$) in different directions below the phase transition temperature (tetragonal structure), and FIG. 2(c) is a schematic view illustrating a crystal structure in the neighborhood of about 120° C.

A PTC thermistor manufactured by use of properties of the PTC medium has characteristics that resistance values increase with increasing temperature, and is widely used in batteries and so on for the purpose of over-current protection. Thus, the PTC thermistor is known as a device for short-circuit protection like a fuse. However, the PTC thermistor has an advantage of repetitive use unlike a fuse, and is a high reliability device, in which when over-current condition occurs, internal resistance increases to break the circuit without a mechanical contact and restores to low level under the condition of low current at normal temperature or low temperature.

Therefore, in the case that the PTC medium is applied to a battery, and for example, temperature of the battery increases due to a short circuit caused by malfunction of the battery, the PTC medium first acts as a safety device when the temperature reaches about 120° C.

In the anode active material according to the present invention, the shell including the PTC medium is formed on the carbonaceous material core to maximize improvement in electrical characteristics and safety. The PTC medium used in the present invention is not limited to a specific material if it has PTC properties. Typically, the PTC medium is, for example, barium titanate ($BaTiO_3$). In the present invention, "barium titanate" includes pure barium titanate and barium titanate containing a small amount of metal element such as La, Ce, Nd, Pr, Sm, Gd, Nb, Bi, Sb, Ta or Y, or a conductive polymer resin.

An average particle size of the PTC medium included in the shell according to the present invention may vary depending on purpose of use and preparation environment. Preferably, an average particle size of the PTC medium is 1 µm or less for the objects of the present invention. As the average particle size is smaller than 1 µm, efficiency of a dry coating process according to the present invention is maximized, and thus the minimum of the average particle size is not limited to a specific value. For example, the average particle size of the PTC medium may be about 2 nm, however the present invention is not limited in this regard. If the average particle size of the PTC medium is more than 1 µm, it is not preferable because efficiency and reproducibility of a surface coating process of the carbonaceous material of the core is reduced, however the present invention is not limited in this regard. When a dry coating method is applied, a coating material should have a sufficient specific surface area so as to coat the surface of the anode active material, that is, a corresponding specific surface area in the form of a layer. Accordingly, if the average particle size of the PTC medium is more than 1 µm, it is not preferable in aspect of coating efficiency because a portion of the PTC medium involved in coating is reduced and the rest remains in a simply mixed state.

The content of the PTC medium according to the present invention may be properly selected according to kind of the carbonaceous material of the core or kind of batteries where the anode active material is used. For example, a weight ratio between the carbonaceous material of the core and the PTC medium may be 'carbonaceous material:PTC medium=100: 0.1 to 100:2', however the present invention is not limited in this regard. If the content of the PTC medium is less than 0.1 parts by weight based on 100 parts by weight of the carbonaceous material, effect of usage of the PTC medium is insignificant. If the content of the PTC medium is more than 2 parts by weight, a specific capacity of the anode active material may be reduced. When the content of the PTC medium is in the above-mentioned range, surplus PTC medium is not generated and the entire surface of the carbonaceous material is coated, thereby obtaining the results pursued by the present invention.

Optionally, the shell of the anode active material according to the present invention may further include a metal oxide such as titanium dioxide or spinel-type lithium titanium oxide, singularly or in combination.

For example, the spinel-type lithium titanium oxide serves as a binder between the PTC medium and the carbonaceous material of the core, and may directly affect deagglomeration and spherization of the core material. And, the spinel-type lithium titanium oxide ($Li_4Ti_5O_{12}$) has faster charge rate than the carbonaceous material of the core in the neighborhood of 1.0 V to 1.2 V based on a lithium metal, so that a film of good ion conductivity is formed on the surface of an anode in the above-mentioned range. And, the activated layer of lithium titanium oxide reduces the surface resistance of the anode and prevents a reaction with an electrolyte to further improve safety and life characteristics.

In an instance where natural graphite is used without the spinel-type lithium titanium oxide, charge/discharge efficiency and charge/discharge capacity reduce remarkably while charge and discharge cycles are repeated, which is resulted from a decomposition reaction of an electrolyte liquid occurring at an edge portion of the natural graphite of high crystallinity.

However, the present invention uses spinel-type lithium titanium oxide as a shell coating a carbonaceous material to suppress a reaction between an edge portion of the carbonaceous material and an electrolyte liquid, thereby solving the above-mentioned problem. And, in an instance where low crystallinity carbon is surface-coated according to the present invention, effects to suppress a reaction with an electrolyte and moisture sensitivity are increased through the surface coating, thereby improving the battery performance.

And, the layer formed by the spinel-type lithium titanium oxide suppresses a reaction between the carbonaceous material of the core and a non-aqueous electrolyte liquid, and consequently prevents decomposition of the non-aqueous electrolyte liquid or structural destruction of the anode. Accordingly, a phenomenon that lithium is deposited on the surface of the anode active material is suppressed to reduce an amount of heat resulted from the reaction with the electrolyte liquid.

An average particle size of the metal oxide that may be included in the shell of the anode active material according to the present invention may vary depending on purpose of use or manufacturing environment, for example 20 nm to 800 nm. The above-mentioned range is preferable because agglomeration of particles is minimized and a coating process is performed effectively.

The content of the metal oxide that may be included in the shell of the anode active material according to the present invention may be properly selected according to purpose of use and kind of lithium secondary batteries or preparation environment. For example, a weight ratio between the carbonaceous material of the core and the metal oxide is adjusted such that carbonaceous material:metal oxide=100:0.55 to 100:5.

Optionally, the shell of the anode active material according to the present invention may further include a conductive material. The conductive material can improve discharge/charge characteristics by suppressing an increase in powder resistivity caused by materials constituting the shell and by increasing conductivity of the anode active material.

The conductive material according to the present invention may include conductive metal, conductive carbon and conductive polymer, for example Li, carbon nano tube, Ketjen black, acetylene black, graphite, activated carbon, Super-P, or conductive polymer resin, singularly or in combination, however the present invention is not limited in this regard. Preferably, the conductive material has an average particle size of 800 nm or less. As the average particle size is smaller than 800 nm, a specific surface area of the conductive material increases to reduce its addition amount or to increase a coating effect. And, the minimum of the average particle size is not limited to a specific value. For example, a conductive material of about 1 nm or more may be used for the convenience of handling, however the present invention is not limited in this regard. And, if the average particle size is more than 800 nm, it is not preferable because it is difficult to form a shell together with the other materials constituting the shell.

The content of the conductive material in the shell may be selected according to purpose of use and kind of lithium secondary batteries or preparation environment. For example, 0.1 parts by weight of the conductive material may be included based on 100 parts by weight of the carbonaceous material, however the present invention is not limited in this regard. If the content of the conductive material is less than 0.1 parts by weight, effect of usage of the conductive material is insignificant. And, in the case that an excessive amount of conductive material is used, after involvement in coating, surpluse conductive material remains on the surface of the anode active material or is mixed with the anode active material to eliminate the need of an additional conductive material in the preparation of a slurry, thereby reducing the time required to prepare the slurry, and therefore, the maximum of the content of the conductive material in the shell is not limited to a specific value. For example, the maximum of the content of the conductive material may be 0.5 parts by weight in consideration of improvement in conductivity and coating performance, however the present invention is not limited in this regard.

A method for coating the carbonaceous material core with the metal oxide may employ a typical coating process used in the prior art without limitation, and the method may properly select a coating process according to necessity. For example, a typical coating process includes a dry coating process and a wet coating process.

The wet coating process allows uniform dispersion of coating materials. For example, generally the wet coating process is performed as follows: a dispersion liquid or suspension liquid, in which coating materials are dispersed, or a solution in which coating materials are dissolved is sprayed onto or impregnated into an anode active material and then dried. However, in the case that a coating solution using water as a solvent is used in the wet coating process, a surfactant is needed for a proper mixing between a carbonaceous material of a core and metal oxide of a shell, and an aqueous solution is used as a solvent. For this reason, it may be difficult to, after coating, completely remove water contained in micropores of the carbonaceous material, $H_2O$ resulted from a reaction, and the surfactant in the preparation of the anode active material. And, drying and pulverizing processes are additionally required, and after the pulverizing process, the surface shape may become ununiform, resulting in deteriorated powder characteristics.

Meanwhile, the dry coating process coats the surface of a core with shell coating materials in a mechanical manner. A shear force, a collision force or a compression force is applied according to necessity, thereby allowing simple mixing and coating. In particular, in the present invention, spherization and deagglomeration simultaneously occur to a carbonaceous material of the core by nano-sized metal oxide included in the shell, thereby improving powder characteristics. Therefore, the present invention can use both of a wet coating process and a dry coating process, preferably a dry coating process.

Through the above-mentioned method, the anode active material of the present invention can be obtained, and an anode of a lithium secondary battery and a lithium secondary battery can be manufactured using the anode active material. In the manufacture of the anode of a lithium secondary battery and the lithium secondary battery using the anode active material of the present invention, a typical method used in the prior art can be applied without limitation.

By way of illustration, a method for manufacturing a lithium secondary battery is described as follows.

First, an electrode active material layer is formed on a current collector by coating the current collector with an electrode active material composition including an electrode active material, a binder, a conductive material and a solvent. At this time, the electrode active material layer is formed such that the electrode active material composition is directly coated on the current collector, or such that the electrode active material composition is coated on a separate support and dried to form a film, and the film is separated from the support and laminated onto the current collector. Here, the support is not limited to a specific one if it is capable of supporting the electrode active material layer, for example a Mylar film or a polyethyleneterephthalate (PET) film.

The electrode active material, the binder, the conductive material and the solvent may be all typical ones used to manufacture a lithium secondary battery. For example, an electrode active material for a cathode may be a lithium-containing metal oxide such as $LiCoO_2$, $LiNiO_2$ and $LiMn_2O_4$, or a lithium-containing metal oxide obtained by adding Co, Ni or Mn to the above-mentioned lithium-containing metal oxide, such as $LiNi_{1-x}Co_xO_2$, or may be sulfide, selenide or halide other than the above-mentioned oxides.

The binder may be polyvinylidenefluoride-hexafluoropropylene copolymer (PVDF-co-HFP), polyvinylidenefluoride, polyacrylonitrile, polymethylmethacrylate, or mixtures thereof. Typically, the conductive material may be carbon black or acetylene black, and the solvent may be acetone or N-methylpyrrolidone.

An electrode is formed as mentioned above, and a separator is interposed between a cathode electrode plate and an anode electrode plate, and thus an electrode assembly is manufactured. Subsequently, the manufactured electrode assembly is put into a case and an electrolyte liquid for a lithium secondary battery is filled into the case, so that a lithium secondary battery of the present invention is completed.

Hereinafter, the preferred embodiments of the present invention are described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

EXAMPLE 1

Preparing of Core-Shell Type Anode Active Material

Mesophase graphite powder (MGP) (made by China Steel Chemical Corporation) was prepared as a carbonaceous material of a core, and spinel-type lithium titanium oxide having a particle size distribution of 30 to 800 nm was prepared as a material of a shell. And, barium titanate having an average particle size of 400 nm, Super-P having an average particle size of 500 nm and $TiO_2$ having an average particle size of 20 nm were prepared. Next, 1,000 g MGP, 18 g spinel-type lithium titanium oxide, 10 g barium titanate, 5 g Super-P and 1 g $TiO_2$ were mixed with each other, and the mixture was treated in a dry coating system (Hosokawa Micron Corp., Japan, NOB-130) with a rotation speed of 2500 rpm for 3 minutes to prepare a core-shell type anode active material.

<Manufacturing of Anode and Lithium Secondary Battery>

The prepared anode active material, conductive carbon for providing conductivity, and PVdF (polyvinylidenefluoride) as a binder were mixed with a mixing ratio of 85/8/7, and a proper amount of NMP (N-methylpyrrolidone) was added to obtain a slurry having a proper viscosity. The slurry was coated on a copper foil, dried and compressed to obtain an anode of a lithium secondary battery.

A lithium metal oxide composite, $LiNi_{(1-x-y)}Mn_xCo_yO_2$ was used as a cathode, a separator was interposed between the above-mentioned anode and a cathode, and an aluminum outer member was applied to manufacture a lithium secondary battery. The battery had a size of 4.5 mm thickness×64 mm width×95 mm length, and a design capacity of 3000 mA h.

EXAMPLE 2

An anode active material, an electrode and a lithium secondary battery were manufactured in the same way as Example 1, except that 15 g spinel-type lithium titanium oxide and 20 g barium titanate were used.

EXAMPLE 3

An anode active material, an electrode and a lithium secondary battery were manufactured in the same way as Example 1, except that $TiO_2$ was not used.

EXAMPLE 4

An anode active material, an electrode and a lithium secondary battery were manufactured in the same way as Example 2, except that $TiO_2$ was not used.

EXAMPLE 5

An anode active material, an electrode and a lithium secondary battery were manufactured in the same way as Example 1, except that spinel-type lithium titanium oxide was not used.

COMPARATIVE EXAMPLE 1

An electrode and a lithium secondary battery were manufactured in the same way as Example 1, except that MGP was used singularly as an anode active material.

COMPARATIVE EXAMPLE 2

An electrode and a lithium secondary battery were manufactured in the same way as Comparative example 1, except that a mixture obtained by simply mixing MGP and barium titanate with a weight ratio of MGP: barium titanate=95:5 was used as an anode active material, but not a core-shell type anode active material.

COMPARATIVE EXAMPLE 3

An electrode and a lithium secondary battery were manufactured in the same way as Comparative example 1, except that MGP was used singularly as an anode active material, and a slurry for forming an anode active material layer on a current collector is prepared by mixing an anode active material, barium titanate, conductive carbon as a conductive material and PVdF as a binder with a mixing ratio of 85/2/6/7.

Characteristics Evaluation

1. Powder Characteristics

Figure 3:
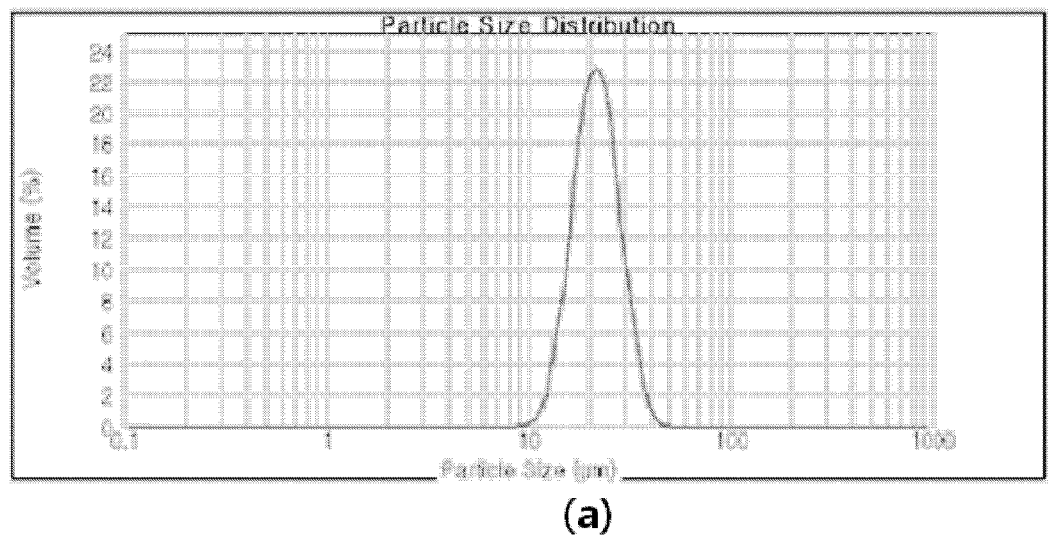
FIG. 3 is a graph illustrating particle size distribution of Example 1 before coating (FIG. 3a) and after coating (FIG. 3b).
Figure 3:
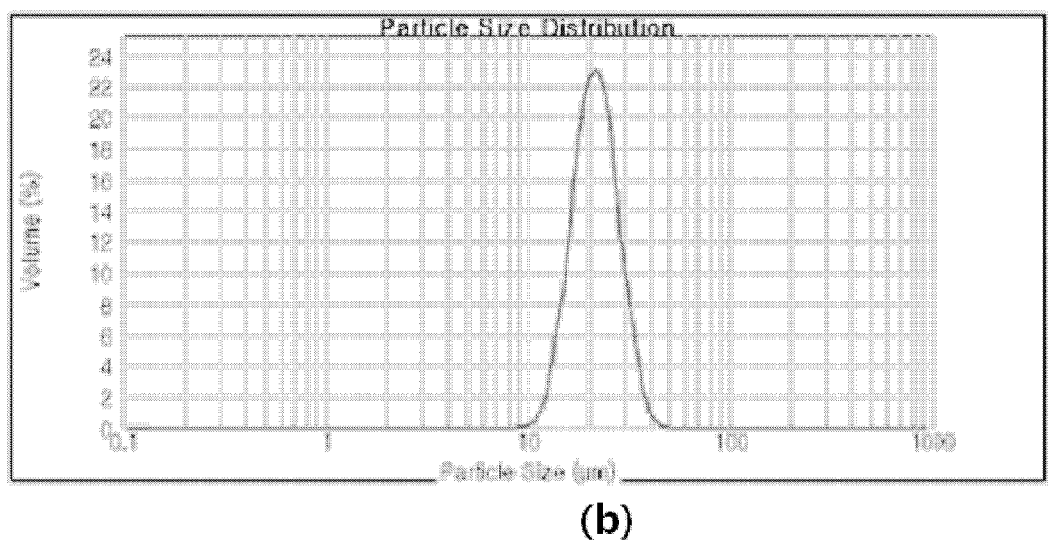

Average particle sizes, $D_{10}$, $D_{50}$ and $D_{90}$ before and after coating of the anode active material prepared according to Example 1 were measured by a laser diffraction technology while particles were dispersed using ultrasonic waves. A particle size analysis system (Malvern Instruments, Mastersizer 2000E) was used to measure the average particle size. FIG. 3(a) shows measurement results of average particle size of the anode active material before coating, and FIG. 3(b) shows measurement results of average particle size after coating. As a specific data, an average particle size before coating is as follows: $D_{10}$=15.569 μm, $D_{50}$=21.692 μm, and $D_{90}$=30.279 μm, and an average particle size after coating is as follows: $D_{10}$=15.525 μm, $D_{50}$=21.587 μm, and $D_{90}$=30.009 μm.

And, 500 times of strokes were performed using 100 Ml mass cylinder to measure a tap density, and changes in volume between before coating and after coating were measured.

As a result of the measurement, the average particle size and tap density hardly changed according to coating content, and after coating, the average particle size decreased by 2%, and the tap density increased by 3 to 5%.

2. Coating Characteristics

Figure 4:
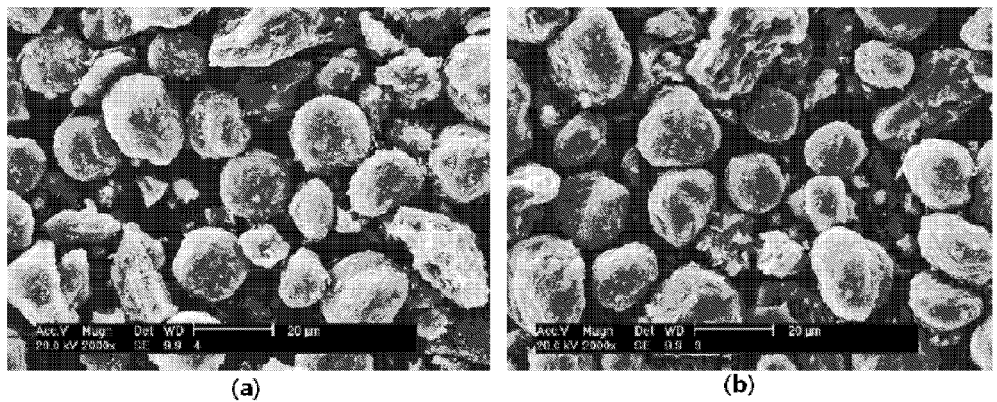
FIG. 4 is an SEM (Scanning Electron Microscope) photograph of each anode active material prepared according to Example 1 (FIG. 4a) and Comparative example 1 (FIG. 4b).
Figure 5:
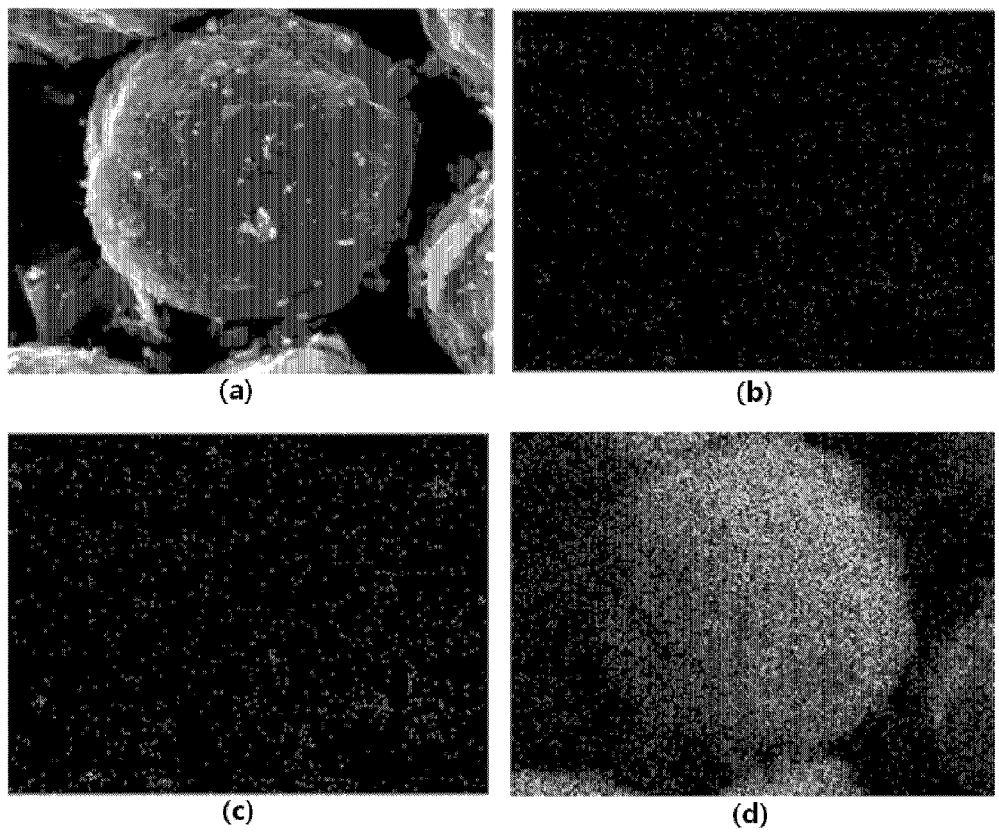
FIG. 5 is an SEM photograph by particle cross-sectional mapping of a core-shell type anode active material prepared according to Example 1 (a: Mapping Image, b: Ti Mapping, c: Ba Mapping, d: C Mapping).

To check the surface characteristics of Example 1 and Comparative example 1, the results measured using SEM (Scanning Electron Microscope) are shown in FIG. 4(a: Example 1, b: Comparative example 1). And, mapping of a particle of a core-shell type carbide obtained in Example 1 is shown in FIG. 5. As shown in FIGS. 4 and 5, the carbonaceous material of the present invention is coated uniformly with barium titanate and lithium titanium oxide.

3. Electrochemical Characteristics (1) Specific Capacity and Initial Efficiency

1) A half cell battery was manufactured according to examples and comparative examples, specific capacity and initial efficiency were measured using the half cell battery by a charge/discharge cycle system, and the measurement results are shown in Table 1.

2) And, a full cell battery was manufactured and initially charged on conditions of CC-CV (constant current-constant voltage) of a current density of 600 mA h and a charge voltage of 4.2 V at 25° C., and after a resting stage of 10 minutes, was discharged with a discharge capacity of 1500 mA h until the voltage is 2.7 V, and initial charge/discharge capacity, initial efficiency and specific capacity were measured, and the measurement results are shown in Table 2.

TABLE 1

| Classification | Coating material* | Coating content (weight %) | Efficiency at 1st cycle (%) | Specific capacity (mAh/g) |
|---|---|---|---|---|
| Example 1 | L, B, C, T | 1.8/1.0/0.5/0.1 | 90.8 | 320.4 |
| Example 2 | L, B, C, T | 1.5/2.0/0.5/0.1 | 90.0 | 314.0 |
| Example 3 | L, B, C | 1.8/1.0/0.5 | 89.7 | 310.0 |
| Example 4 | L, B, C | 1.5/2.0/0.5 | 89.8 | 306.0 |
| Example 5 | B, C, T | 1.0/0.5/0.1 | 91.0 | 321.0 |
| Comparative example 1 | X | X | 91.5 | 330.0 |
| Comparative example 2 | X | 5(B), mixing | 88.5 | 312.0 |
| Comparative example 3 | X | 2(B), addition | 88.0 | 311.0 |

*L: $Li_4Ti_5O_{12}$, B: $BaTiO_3$, C: Super-P, T: $TiO_2$

TABLE 2

| Classification | Coating material | 1st charge cycle (mAh) | 1st discharge cycle (mAh) | Efficiency at 1st cycle (%) | Specific capacity (mAh/g) |
|---|---|---|---|---|---|
| Example 1 | L, B, C, T | 3635.7 | 3036.4 | 83.5 | 149.8 |
| Example 2 | L, B, C, T | 3660.4 | 3062.5 | 83.7 | 149.2 |
| Example 3 | L, B, C | 3635.7 | 3036.5 | 83.5 | 147.8 |
| Example 4 | L, B, C | 3646.0 | 3030.4 | 83.1 | 147.4 |
| Example 5 | B, C, T | 3614.0 | 2918.0 | 80.7 | 139.5 |
| Comparative example 1 | X | 3644.0 | 3011.5 | 82.6 | 150.9 |
| Comparative example 2 | 5(B), mixing | 3611.0 | 2927.4 | 81.1 | 140.6 |
| Comparative example 3 | 2(B), addition | 3701.4 | 3047.3 | 82.3 | 145.3 |

As shown in Tables 1 and 2, it is found that as the coating content of lithium titanium oxide increases, initial charge/discharge efficiency and specific capacity reduces.

And, it is found through Tables 1 and 2 that Examples 1 to 5 have lower initial charge/discharge efficiency and specific capacity than Comparative example 1, and this is because the surface of MGP is coated with nano-sized lithium titanium oxide, consequently an irreversible capacity occurs in a different voltage range, and as a result, the Examples 1 to 5 exhibit a relatively lower specific capacity. However, this is not an important factor of battery characteristics. On the contrary, Comparative example 1 shows higher initial charge/discharge efficiency and specific capacity, but shows very weak characteristics in aspect of conductivity and safety.

(2) Discharge Characteristics

The discharge characteristics with current density change and discharge characteristics at low temperature were measured so as to evaluate how much conductivity is improved.

1) Discharge characteristics with current density change were tested such that charging was made on conditions of CC-CV of a current density of 3000 mA h and a charge voltage of 4.2 V at 25° C., and after a resting stage of 10 minutes, discharging was made with a discharge current of 0.5 to 15.0 C until the voltage is 2.7 V. Table 3 shows a ratio of a discharge capacity at a current density of 15 C to a discharge capacity at a current density of 0.5 C (1500 mA h) as high rate discharge characteristics between before and after coating.

Figure 6:
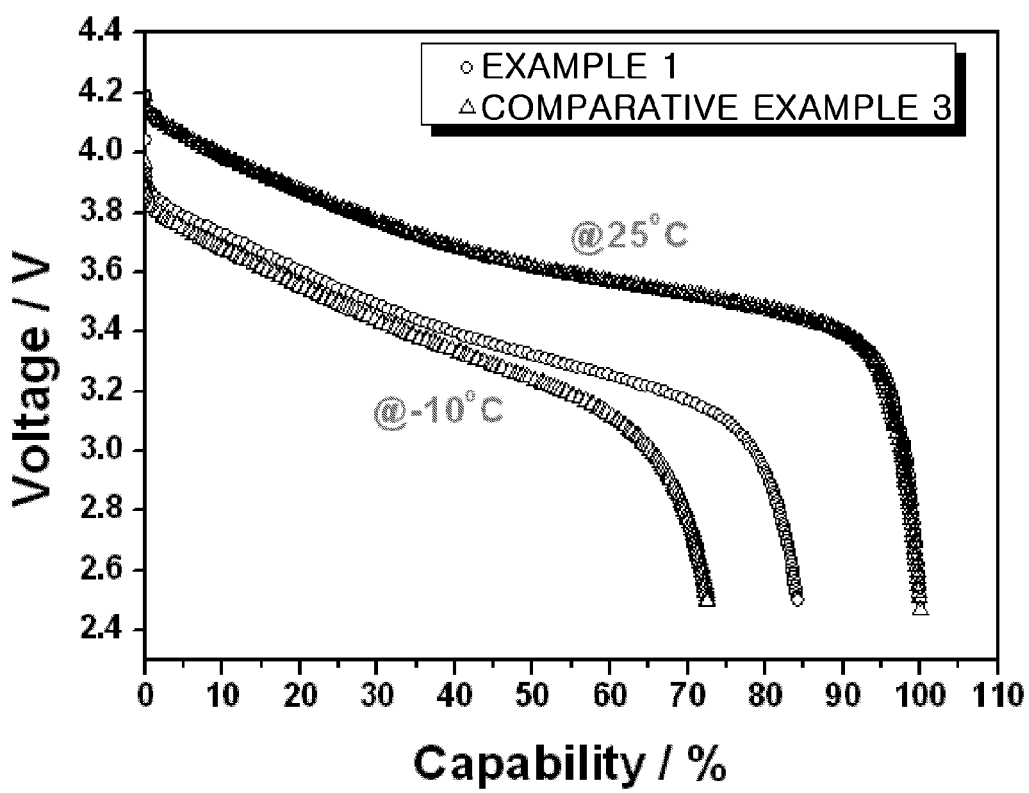
FIG. 6 is a graph illustrating discharge characteristics with temperature change in each lithium secondary battery manufactured using anode active materials prepared according to Example 1 and Comparative example 3.

FIG. 6 is a graph illustrating discharge characteristics with temperature change in each lithium secondary battery manufactured using the anode active materials prepared according to Example 1 and Comparative example 3.

2) Discharge characteristics at low temperature was tested such that charging was made with a current of 1 C at −10° C. based on a current density of 1 C at 25° C. in the voltage range of 2.5 to 4.2 V. The test results of discharge characteristics at low temperature are shown in Table 3, and FIG. 7 is a graph illustrating discharge characteristics with current density change in each lithium secondary battery manufactured using anode active materials prepared according to Example 1 and Comparative example 3.

TABLE 3

| Classification | Coating material | 15 C. discharge characteristics (@ 0.5 C., %) | @ −10° C. discharge characteristics (@ 25° C., %) |
|---|---|---|---|
| Example 1 | L, B, C, T | 86.1 | 84.2 |
| Example 2 | L, B, C, T | 85.9 | 81.3 |
| Example 3 | L, B, C | 83.9 | 78.9 |
| Example 4 | L, B, C | 82.6 | 77.6 |
| Example 5 | B, C, T | 80.4 | 77.5 |
| Comparative example 1 | X | 85.8 | 80.4 |
| Comparative example 2 | 5(B), mixing | 75.7 | 76.2 |
| Comparative example 3 | 2(B), addition | 77.7 | 75.3 |

Figure 7:
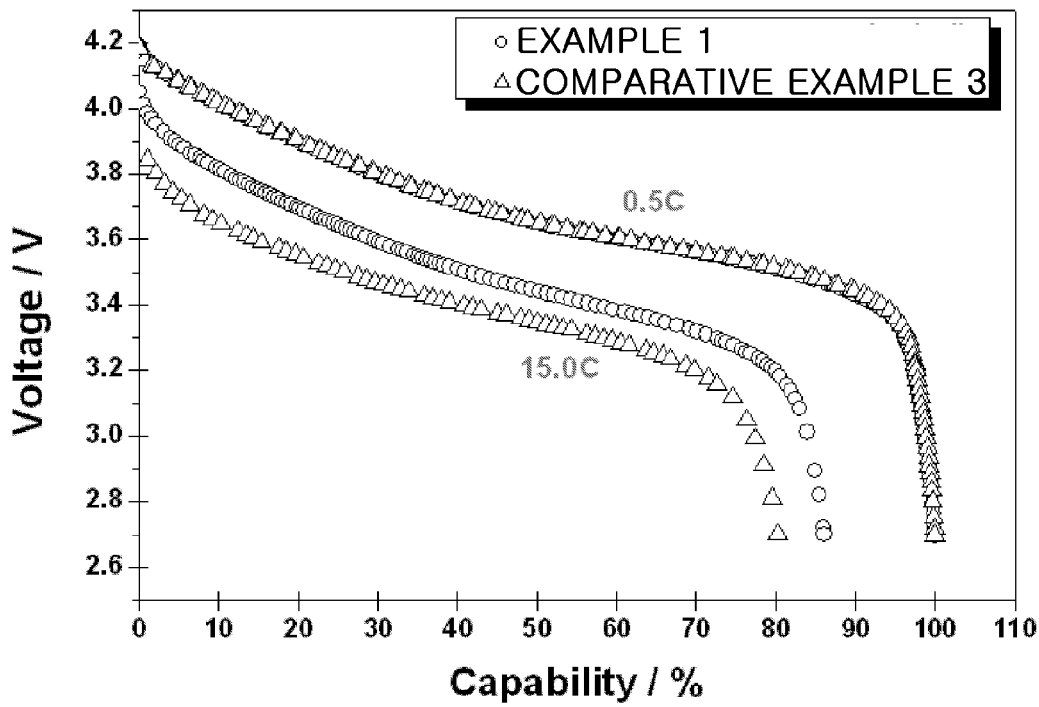
FIG. 7 is a graph illustrating discharge characteristics with current density change in each lithium secondary battery manufactured using anode active materials prepared according to Example 1 and Comparative example 3.

It is found through Table 3 and FIGS. 6 and 7 that conductivity was improved due to high rate discharge characteristics and discharge characteristics at low temperature. The examples suppress a reaction with an electrolyte liquid and reduce the surface resistance of the anode active material by the activated shell coating layer, thereby resulting in improved rate high discharge characteristics and discharge characteristics at low temperature.

Meanwhile, the anode active material of Comparative example 2, obtained by simply mixing the carbonaceous material and barium titanate, and the anode active material of Comparative example 3, obtained by adding barium titanate during preparation of the slurry have difficulty in dispersing the nano-sized barium titanate, resulting in ununiform surface of an electrode. It is found that electrical characteristics of comparative examples, in particular cycle characteristics were deteriorated due to the ununiform electrode surface when compared with examples using the coated core-shell type anode active material.

(3) Overcharge Characteristics, Characteristics after Hot Box Exercise, and Nail Penetration Test The anode active materials prepared according to examples and comparative examples were also evaluated in aspect of overcharge characteristics, characteristics during hot box exercise, and a nail penetration test.

Figure 8:
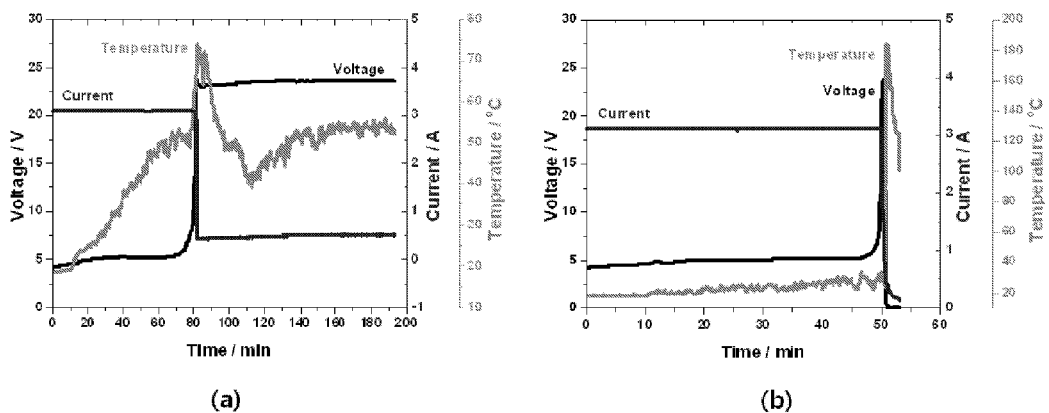
FIG. 8 is a graph illustrating, during an overcharge test at 24 V, cell behavior and surface temperature change of each lithium secondary battery manufactured using anode active materials prepared according to Example 1 (FIG. 8a) and Comparative example 3(FIG. 8b).

1) An overcharge test was performed such that overcharging was made with a current density of 3000 mA h until voltage is 12 V, 18 V and 24 V. The shape change and surface temperature of a battery was observed, and the results are shown in Table 4. FIG. 8(Example 1:a, Comparative example 3:b) is a graph illustrating cell behavior and surface temperature change during an overcharge test at 24 V.

Figure 9:
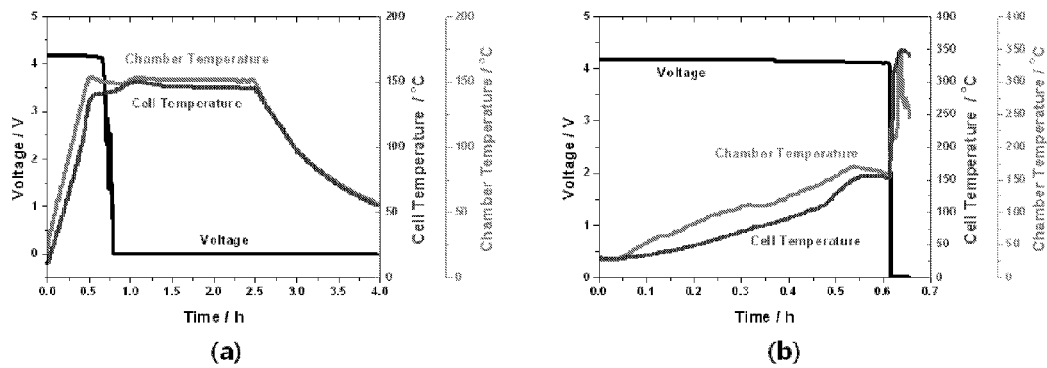
FIG. 9 is a graph illustrating, during a hot box exercise, cell behavior of each lithium secondary battery manufactured using anode active materials prepared according to Example 1 (FIG. 9a) and Comparative example 3(FIG. 9b).

2) Batteries of the same size were used to evaluate thermal safety of the anode active materials obtained in examples and comparative examples. The batteries are fully charged until voltage is 4.2 V, and kept in a hot box of 150° C., and was observed if fire occurs as time goes. The results are shown in Table 4, and FIG. 9 is a graph illustrating cell behavior and temperature change of each battery manufactured using the anode active materials prepared according to Example 1 and Comparative example 3.

Figure 10:
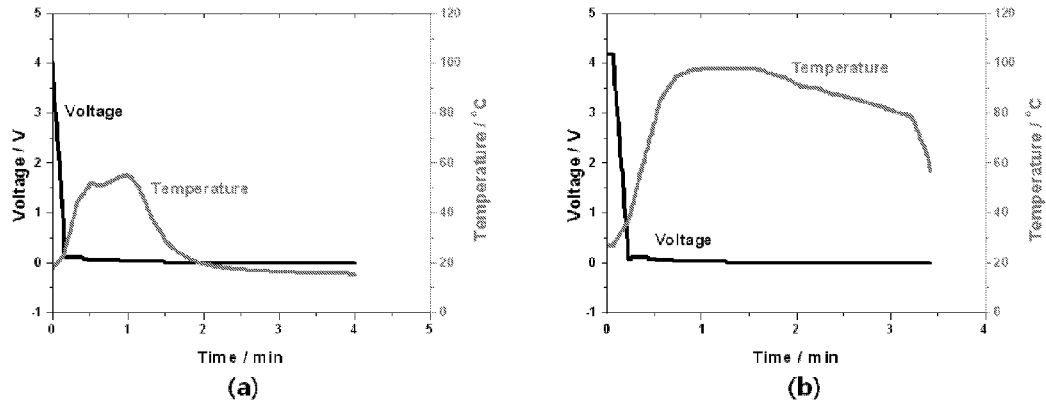
FIG. 10 is a graph illustrating, in a nail penetration test, cell behavior and surface temperature change of each lithium secondary battery manufactured using anode active materials prepared according to Example 1 (FIG. 10a) and Comparative example 3(FIG. 10b).

3) After evaluation of a nail penetration test, battery surface temperature was observed and the results are shown in Table 4. FIG. 10(Example 1:a, Comparative example 3:b) is a graph illustrating cell behavior and surface temperature change of each battery manufactured using the anode active materials prepared according to Example 1 and Comparative example 3.

TABLE 4

| Classification | Cell behavior, Maximum cell surface temperature (° C.) | | | Hot box exercise | Nail penetration test |
| --- | --- | --- | --- | --- | --- |
| | 12 V | 18 V | 24 V | | |
| Example 1 | A, 55 | A, 60 | A, 75 | A, 2 h | A, 55 |
| Example 2 | A, 62 | A, 82 | B, 107 | B, 1 h | A, 68 |
| Example 3 | A, 67 | B, 110 | C, 175 | B, 30 min | A, 60 |
| Example 4 | A, 71 | B, 123 | B, 112 | B, 1 h | A, 62 |
| Example 5 | A, 70 | B, 120 | C, 260 | C, 10 min | A, 65 |
| Comparative example 1 | A, 77 | D, 295 | X | D, 0 min | D, 310 |
| Comparative example 2 | A, 75 | C, 173 | X | C, 10 min | B, 115 |
| Comparative example 3 | A, 68 | B, 106 | D, 183 | C, 7 min | A, 98 |

A: no change, B: smoking, C: fire, D: explosion

As shown in Table 4, generally the batteries of examples have excellent safety. In particular, Comparative example 1 without barium titanate has a very low safety, and Comparative examples 2 and 3 have better safety than Comparative example 1, but has poor electrical characteristics as mentioned above.

In other words, the core-shell type anode active material according to the present invention is the most effective in consideration of electrical characteristics and safety of a battery.

INDUSTRIAL APPLICABILITY

A lithium secondary battery manufactured using the core-shell type anode active material according to the present invention has excellent electrical characteristics and safety.

And, a method for preparing a core-shell type anode active material for lithium secondary batteries according to the present invention has excellent reproducibility and productivity.

The invention claimed is:

1. A core-shell type anode active material for lithium secondary batteries, comprising:
   a carbonaceous material core; and
   a shell coated on the carbonaceous material core and comprising:
   a repetitively usable Positive Temperature Coefficient (PTC) medium; and
   at least one metal oxide selected from the group consisting of titanium dioxide and spinel-type lithium titanium oxide,
   wherein the weight ratio of the carbonaceous material and the PTC medium (the carbonaceous material : the PTC medium) is 100:1 to 100:2, and
   wherein the weight ratio of the carbonaceous material and the metal oxide (the carbonaceous material : the metal oxide) is 100:1 to 100:2.

2. The core-shell type anode active material for lithium secondary batteries according to claim 1,
   wherein the carbonaceous material of the core is at least one selected from the group consisting of soft carbon, hard carbon, natural graphite, Kish graphite, pyrolytic carbon, mesophase pitch based carbon fiber, meso-carbon microbeads, mesophase pitches, and petroleum and coal tar pitch derived cokes.

3. The core-shell type anode active material for lithium secondary batteries according to claim 1,
   wherein the PTC medium has an average particle size of 2 nm to 1 μ.

4. The core-shell type anode active material for lithium secondary batteries according to claim 1,
   wherein the PTC medium is barium titanate.

5. The core-shell type anode active material for lithium secondary batteries according to claim 1,
   wherein the metal oxide has an average particle size of 20 to 800 nm.

6. The core-shell type anode active material for lithium secondary batteries according to claim 1,
   wherein the shell further comprises a conductive material.

7. A method for preparing a core-shell type anode active material for lithium secondary batteries, comprising:
   (S1) preparing a core forming carbonaceous material; and
   (S2) forming a shell by coating the carbonaceous material core with a shell forming material comprising a PTC medium.

8. The method for preparing a core-shell type anode active material for lithium secondary batteries according to claim 7,
   wherein, in the step (S2), the coating is dry coating.

9. The method for preparing a core-shell type anode active material for lithium secondary batteries according to claim 7,
   wherein, in the step (S2), the shell forming material further comprises at least one metal oxide selected from the group consisting of titan dioxide and spinel-type lithium titan oxide.

10. The method for preparing a core-shell type anode active material for lithium secondary batteries according to claim 7,
    wherein, in the step (S2), the shell forming material further comprises a conductive material.

11. An anode of lithium secondary batteries, formed on at least one side of an anode current collector and having an anode active material layer including an anode active material of claim 1, a binder and a conductive material.

12. A lithium secondary battery, comprising the anode of claim 11.

* * * * *